Oct. 2, 1945.  A. W. ALTORFER  2,385,769
WRINGER MECHANISM
Filed Nov. 9, 1932  5 Sheets-Sheet 1

INVENTOR
Alpheus W. Altorfer
Tefft & Tefft
ATTYS

Oct. 2, 1945.                A. W. ALTORFER                2,385,769
                           WRINGER MECHANISM
                        Filed Nov. 9, 1932          5 Sheets-Sheet 2
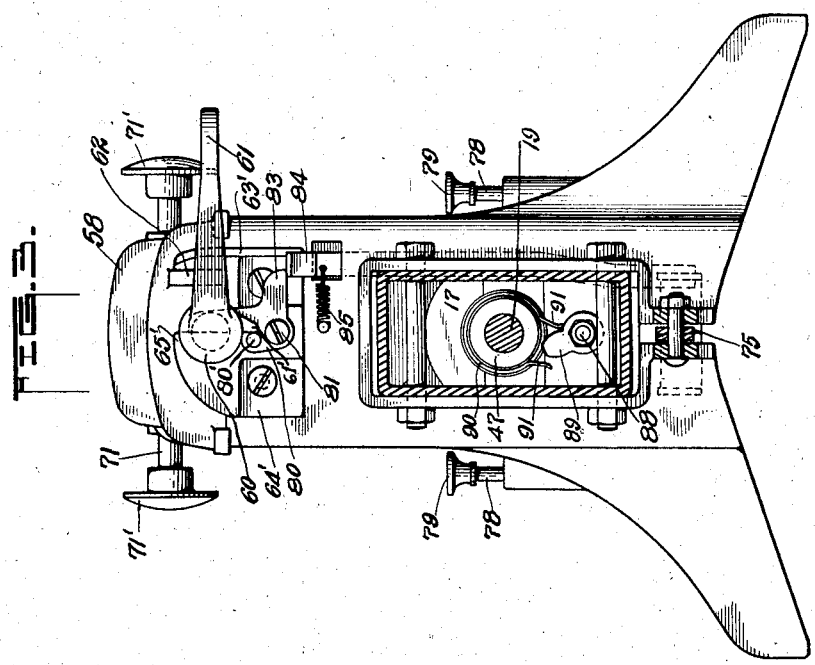
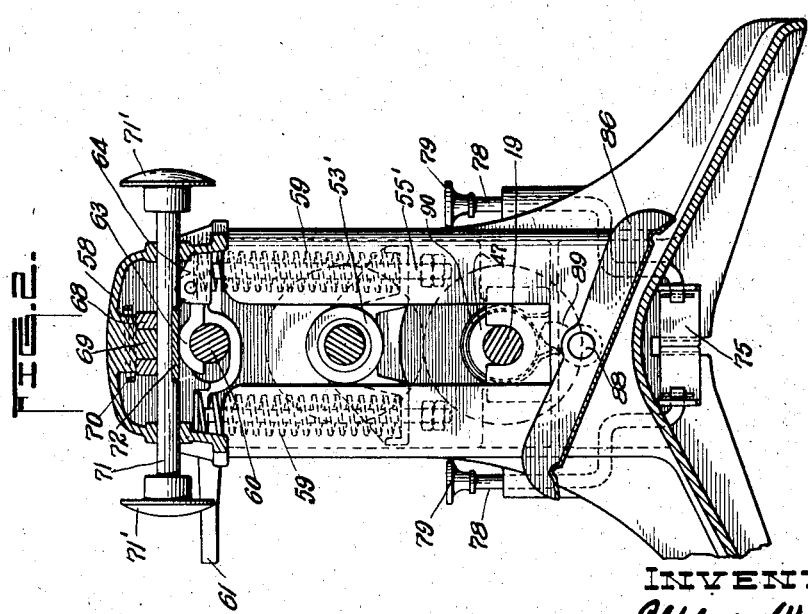
INVENTOR.
Alphens W. Altorfer
BY
Jeff & Jeff
ATTY'S Oct. 2, 1945.  A. W. ALTORFER  2,385,769
WRINGER MECHANISM
Filed Nov. 9, 1932  5 Sheets-Sheet 3
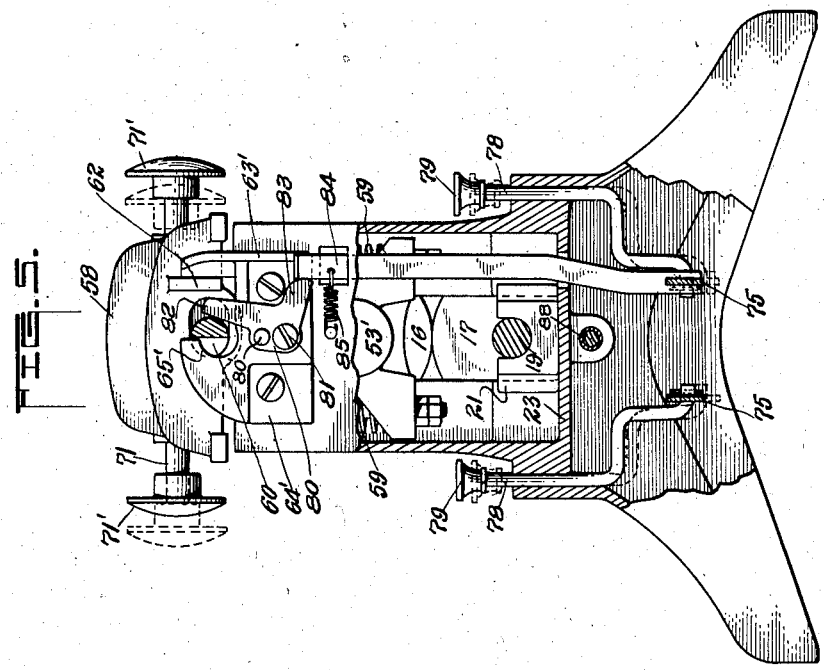
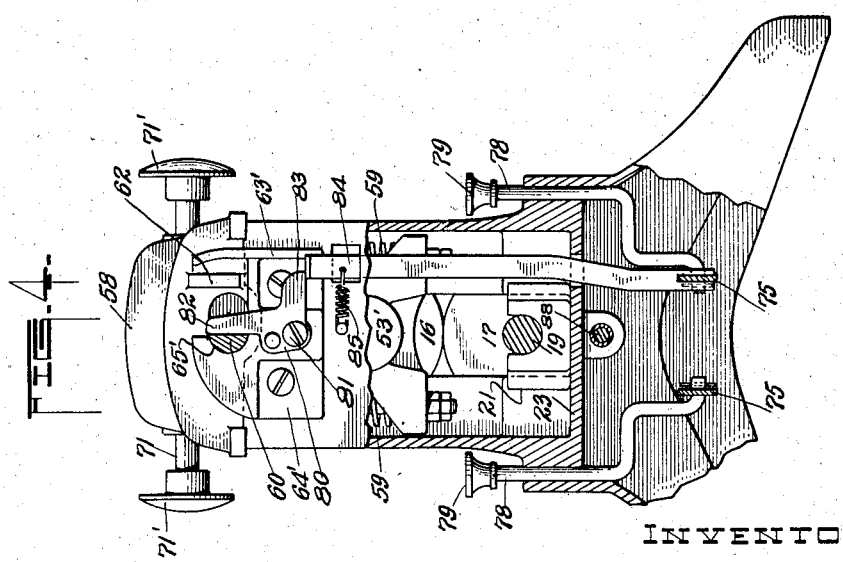
INVENTOR.
Alpheus W. Altorfer
BY
Tefft & Tefft
ATTY'S

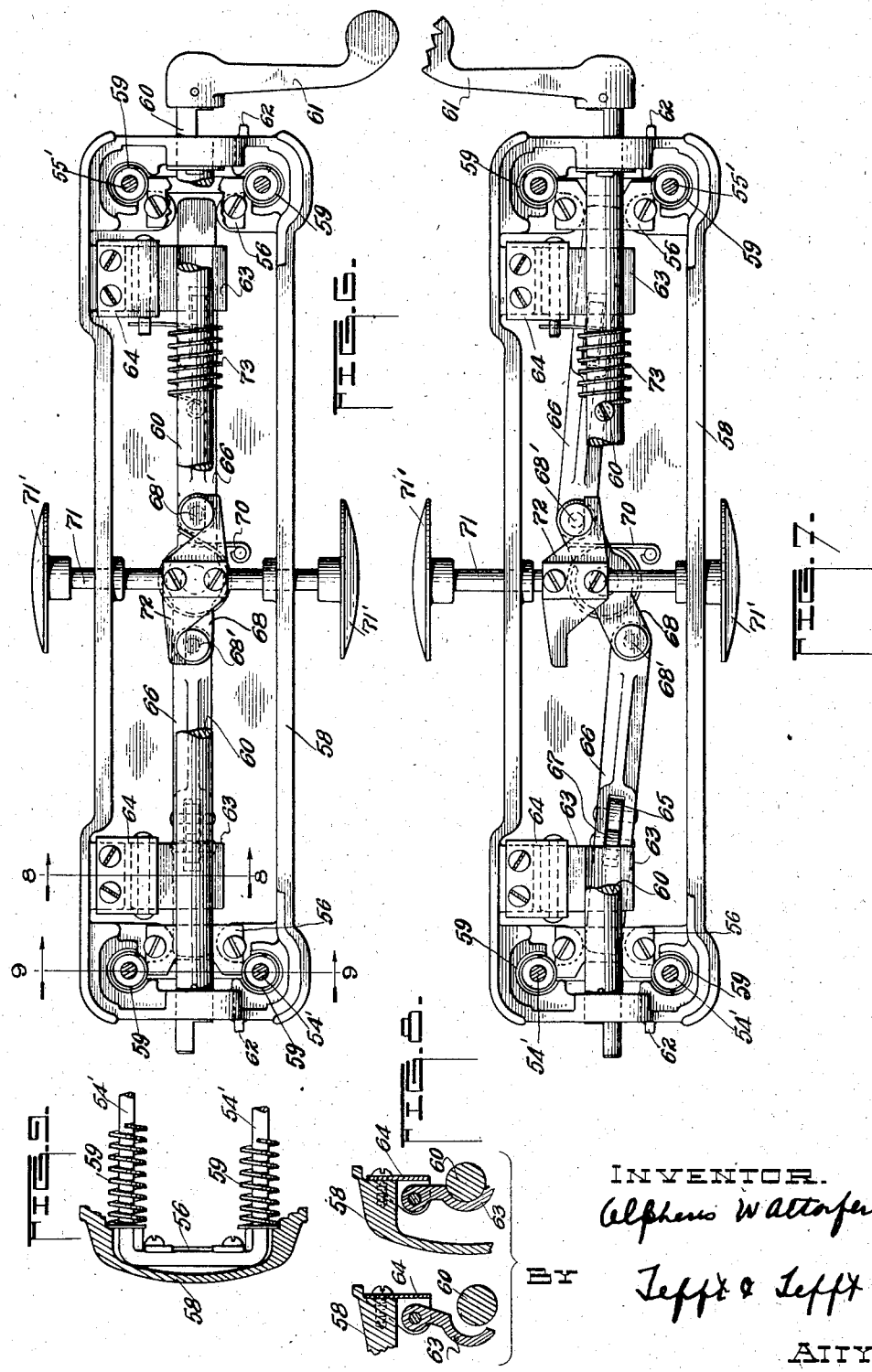

Oct. 2, 1945.  A. W. ALTORFER  2,385,769
WRINGER MECHANISM
Filed Nov. 9, 1932  5 Sheets-Sheet 5
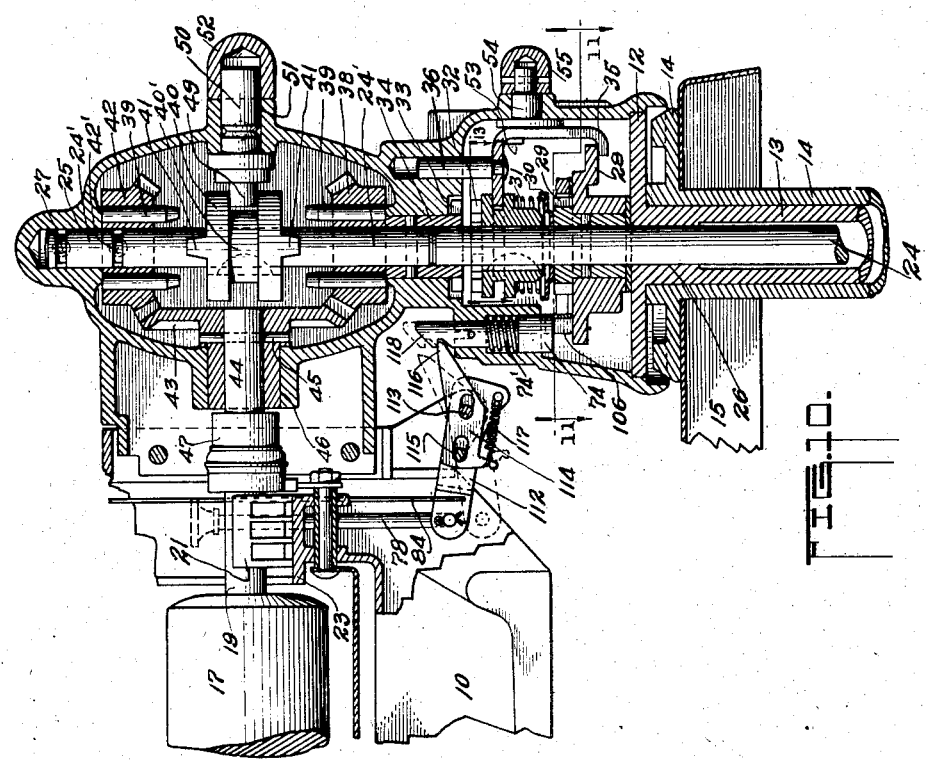
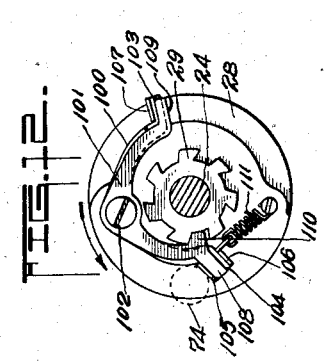
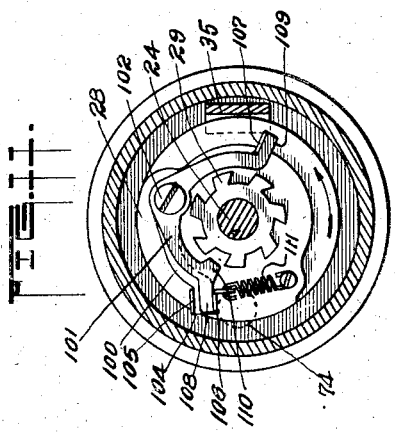
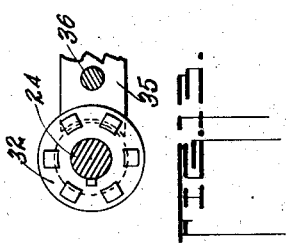
INVENTOR.
Alpheus W. Altorfer
BY
Tifft & Tifft
ATTY'S Patented Oct. 2, 1945

2,385,769

UNITED STATES PATENT OFFICE 2,385,769

WRINGER MECHANISM

Alpheus W. Altorfer, Peoria, Ill.

Application November 9, 1932, Serial No. 641,847

45 Claims. (Cl. 68—253)

This invention relates to wringing mechanism.

One of the objects of the invention lies in the provision of a safety release mechanism for wringers whereby said safety release mechanism will be automatically reset upon release of tension between the rolls.

Another object lies in the provision of a novel means for latching the upper frame portion of a wringer to the lower frame and quick release mechanism operatively associated therewith and carried by the upper frame, whereby relief of tension and release of the upper frame by manual operation will result in the immediate automatic resetting of the safety device.

Still another object lies in the provision of a means for connecting the upper frame to the lower frame of a wringer in a tensioned manner by manual operation and an additional safety release mechanism controlling the operation of said latching or connecting mechanism, said safety release mechanism including latch and wedge members carried by the head and a readily accessible manually operated member controlling the movement of said wedge members.

Yet another object lies in the particular manner of associating a releasable upper frame to the lower frame of a wringer including the manner of mounting the spring members in connection with the bearing supports for the upper roll as well as a safety release mechanism which cooperates with the normally operated means for holding the upper frame in a locked and tensioned relation to the lower frame.

A further object lies in the provision of a wringer which includes a lower frame and an upper frame and a horizontal shaft carried by the upper frame, said shaft when held in a fixed position permitting the upper frame to be connected to the lower frame in a locked and tensioned position, there being, however, another release mechanism carried by the upper frame normally operative to hold said shaft in a fixed position, but which upon release of a readily accessible manually operated member operates to permit lateral movement of the horizontal shaft, and thus permit immediate quick release of the upper frame and relief of tension.

A still further object lies in the provision of a wringer driving means therefor and a control of the driving means comprising a clutch in said driving means and a novel connection between the clutch and the release means for the upper frame whereby said clutch will be operated to stop the driving mechanism when there is a release of the upper frame and a relief of pressure between the rolls.

Yet a further object is in the control means for a wringer mechanism, said control means comprising a clutch in the driving mechanism, a power driven clutch actuating means therefor and finally a manually operated member so connected to the clutch actuating means as to prevent repeating action of the clutch.

An additional object lies in the provision of a control means for a wringing device, wherein the driving means therefor has a clutch member therein and a manually operated means for controlling the clutch, said manually operated member being so connected and arranged with the clutch as to prevent a repeating action of said clutch.

Other objects will appear in the following specification, taken in connection with the annexed drawings, in which—

Fig. 2 is a sectional elevational view as the same would appear if taken on line 2—2, see Fig. 1;

Fig. 3 is an end elevational view, certain parts being shown in cross section as the same would appear if taken on line 3—3, see Fig. 1;

Fig. 4 is an elevational view, certain parts being broken away and shown in cross section in order to show clutch release mechanism, taken on line 4—4, see Fig. 1;

Fig. 5 is an elevational view similar to Fig. 4, showing the wringer top in its released position;

Fig. 6 is a plan view, certain parts being broken away in order to show release mechanism as the same would appear if taken on line 6—6, looking in the direction of the arrows, see Fig. 1;

Fig. 7 is a plan view similar to Fig. 6, showing the release mechanism shifted to one of its releasing positions;

Fig. 8 is a fragmentary detail view in section as the same would appear if taken on line 8—8, see Fig. 6;

Fig. 9 is a detailed sectional view as the same would appear if taken on line 9—9, see Fig. 6;

Fig. 10 is a transverse sectional elevational view of the wringer driving mechanism, showing a variation in the manual control means;

Fig. 11 is a sectional detail view of clutch operating mechanism, as viewed from line 11—11 in Fig. 10;

Fig. 12 is a view of certain parts shown in Fig.

Figure 1:
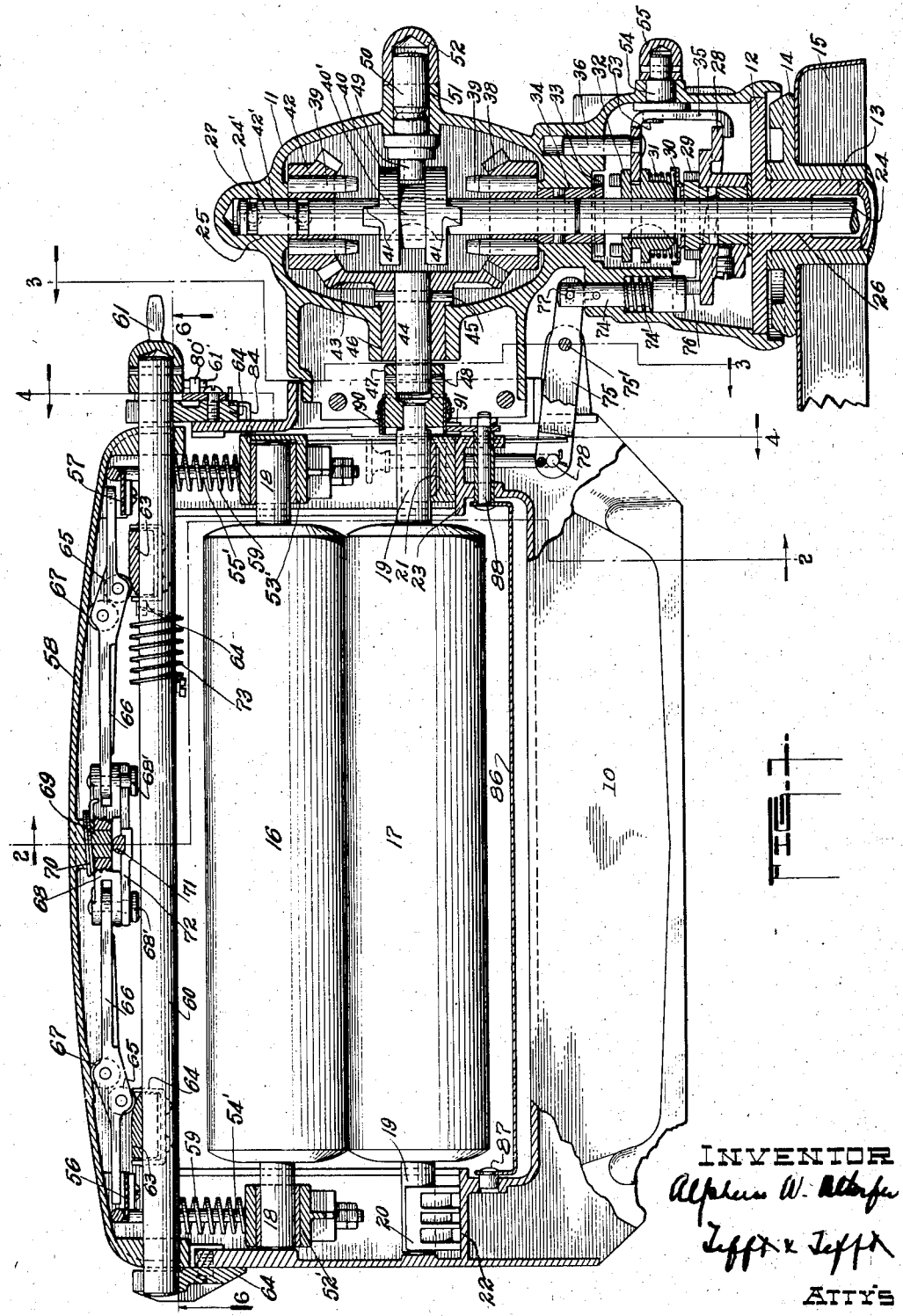
Fig. 1 is a transverse sectional elevational view of my clothes wringer and clutch transmission therefor.

11 showing the clutch operating devices in engaged position; and

Fig. 13 is a detail view of one member of the driving clutch unit, as viewed from line 13—13 in Fig. 10.

Fig. 1 will disclose a wringer frame structure 10 which is affixed to and supported by a housing and supporting structure 11, the latter being secured to and supported by a flanged bottom member 12 having a downwardly depending circular stem or boss portion 13 which is adapted to be rotatably supported by and within a base member 14. Base member 14 is secured to a portion 15 of any suitable support, for example, a washing machine.

Support 15 and base member 14 comprising no part of the present invention, will not be further described other than to say that they form a suitable supporting means for the mechanism to be described.

Wringer rolls 16 and 17, mounted upon shafts 18 and 19, are suitably supported in the structure 10. The shaft 19 of the lower or power driven roll 17 is journaled in bearing blocks 20 and 21 which are supported upon shelf portions 22 and 23 formed in the body of structure 10.

Supporting means for the upper roll 16 will be explained later.

Lower roll 17 is adapted to be rotated by the following means:

Vertically disposed within structure 11 is a shaft 24 journaled at its upper end in the bore of a clutch member 33 and in a lower portion in a bearing 26 formed in the bottom member 12, as shown. Downward vertical movement of shaft 24 is prevented by the hub portion of a ratchet member 29 seated upon an annular bearing portion of the bottom member 12. As shown in Fig. 1, the lower end portion of shaft 24 is broken away. The portion not shown being no part of this invention will not be explained further than to say that the lower end of the shaft is suitably connected with a power source adapted to rotate the shaft.

Mounted upon shaft 24 adjacent the bottom member 12 and disposed within a lower housing portion of structure 11 is a clutching mechanism which, having been fully explained in my Patent No. 1,868,343, will be but briefly explained here.

A cam member 28 is rotatably mounted upon the boss portion of a ratchet member 29 which is affixed to shaft 24. Resting upon ratchet 29 is a member 30 supporting a spring 31 which reacts to propel a keyed toothed clutch member 32 upwardly toward engagement with a similarly toothed clutch member 33, the latter being affixed to a shaft 24' and having a boss portion adapted to rotate in a bearing 34 formed in the body of structure 11. Clutch member 33 and shaft 24' will be referred to later. A vertically movable link member 35 is adapted to be engaged by cam member 28 and to engage within a continuous groove formed in the body of clutch member 32.

Spring 31 being adapted to propel clutch member 32 upwardly, obviously tends to maintain the lower portion of link 35 in contact with cam 28 in such a manner that the undulating form of the cam, when rotated, is followed by vertical movement of clutch member 32 into or out of engagement with the member 33. The link 35 is retained in suitable alignment by means of an affixed stud 36 which is slidably mounted in a circular cavity in structure 11 as shown. Auxiliary means for operating the clutch member 32 is provided by a stud 53 eccentrically mounted upon a flanged portion of a stub shaft 54 which is journaled in structure 11 and has a knob 55 affixed to its outer end, as shown. Stud 53 engages in a slot formed in link 35. Manipulation of the knob 55 results in vertical movement of link 35 to propel clutch 32 into or out of engagement with clutch member 33.

Means for controlling rotation of the cam 28 to effect clutching and declutching of member 32 will be explained later.

Above shaft 24 and in axial alignment therewith is a shaft 24' having its upper end journaled in a bearing 25 formed in structure 11 and its lower end affixed within the hub portion of a clutch member 33, which hub portion is journaled in a bearing 34 formed in structure 11. Downward vertical movement of shaft 24' is prevented by a retaining screw 27 engaging in a continuous groove formed in the upper end of the shaft, as shown.

Above the clutch member 33 and disposed within an upper housing portion of structure 11 is a bevel gear 38 which is rotatably seated upon a boss portion of structure 11 and rotatably mounted upon shaft 24'. Gear 38 carries a plurality of pins as 39 affixed in the body thereof, the said pins being adapted to act as teeth which may be engaged by tooth portions 41 of a clutch member 40 which is slidably mounted, in keyed relation, upon shaft 24'. Clutch member 40 has, at either end, projecting tooth portions as 41 and a continuous groove 40' about its central portion as shown.

Above clutch member 40 is a bevel gear 42 having affixed pins similar to pins 39 and rotatably retained in suitable position upon shaft 24' by means of a retaining screw 42' travelling in a continuous groove formed in the shaft, as shown.

Meshed with gears 38 and 42 is a bevel gear 43 having an elongated hub portion and a stud member 44 affixed therein by means of a pin 45. The elongated hub portion of gear 43 is adapted to rotatably support it in a bearing 46 formed in structure 11. Stud 44 has affixed to its extended end a collar member 47 which is secured to the stud by means of a pin 48. Collar 47 has at its outer end a slot which is adapted to receive a flattened end of roller shaft 19, as shown.

Referring again to clutch member 40, it will be noted that the groove 40' is engaged by stud 49 which is eccentrically mounted upon a flanged portion of a stub shaft 50 which latter is rotatably retained in a bearing 51 formed in structure 11. To the outer end of stub shaft 50 is attached a knob member 52, by means of which clutch member 40 may be propelled from a central or neutral position toward and into engagement with either gear 38 or 42.

The foregoing will illustrate that lower wringer roll 17 may be rotated by power derived from shaft 24, as follows:

With shaft 24 rotating and cam 28 positioned as shown in Fig. 1, clutch 32 will be rotated in unison with the shaft. Rotation of cam 28 through 180 degrees will position the high side of cam in contact with link 35, allowing spring 31 to propel clutch 32 upwardly into engagement with clutch member 33, thus imparting unitary rotation to shaft 24' and clutch member 40. Manipulation of knob 52 to propel clutch member 40 into engagement with gear 38 will impart unitary rotation to gears 38 and 43, which will result in rotation of shaft 19 of roll 17 through coupling means already noted. Obviously, the direction of rotation of roll 17 may be reversed by shifting of clutch member 40 into engagement with gear 42, as described.

Shaft 18 of upper wringer roll 16 is rotatably mounted in bushed bearing blocks 52' and 53', which are slidably supported upon the leg portions of inverted U-shaped hanger members 54' and 55', the latter being suitably supported by means of bracket members 56 and 57, which are affixed to the upper transverse frame member 58. Compression springs 59, retained upon the legs of hangers 54 and 55 are seated at their upper ends upon washers which abut within transverse member 58, as shown in Fig. 9 and at their lower ends upon bearing blocks 52' and 53', as shown in Fig. 2, and react to propel the bearing blocks downwardly, sliding upon the hanger legs, to maintain pressure contact of roll 16 against roll 17.

Transverse member 58 is retained in proper position upon the frame structure 10 by means of a shaft member 60, which is retained in movable relation, within slots formed in both ends of member 58, the arrangement being shown in several views such as Figs. 2, 4, 5 and 6. Referring to Figs. 6 and 4, it will be noted that shaft 60 is shaped, at the left hand end, to have a half circular cam form and at the right hand end to have a similar form with an extended portion which carries an affixed hand lever 61 by means of which the shaft may be rotated as will be later explained.

The uprights of frame structure 10 and the ends of transverse member 58 are provided with suitable guide portions adapted to retain the transverse member in proper vertical alignment with the structure 10, member 58 being free to move vertically but retained against lateral movement. A particular means of opposing lateral movement of member 58 is provided in the arrangement shown in Figs. 4 and 5, wherein lug portions 62, identical at each end of member 58, project from each end thereof and are abutted by upright extensions 63' of bracket members 64' which are affixed to the uprights of structure 10, as shown.

Brackets 64' are provided, at the side opposite extensions 63', with hook portions 65' which are adapted to receive the half circular portions of shaft 60, as clearly shown in Fig. 4. It will be evident that shaft 60 retained in the position shown in Fig. 4, engaged by hook 65', may, through its described mounting in member 58, retain the said member in locked relation upon structure 10, whereas rotation of shaft 60, through 180 degrees to the position shown in Fig. 5 and/or lateral movement of shaft 60 within its slotted mounting in member 58 will disengage shaft 60 from hook 65' to permit vertical movement of member 58, as induced by springs 59 abutting the bearings 52' and 53', and roll 16. The described movement of member 58 will obviously permit relaxation of springs 59 and thereby remove the contact pressure between rolls 16 and 17.

From the foregoing it will be apparent that the locking action of shaft 60, as retained by hooks 65', depends first, upon its rotated position relative to the hooks 65', and second, to its lateral position within the slots in which it is mounted.

Considering the views shown in Figs. 4 and 5, it will be evident that with member 58 in released and elevated position, and shaft 60 disposed as shown in Fig. 5, clockwise rotation of shaft 60 by means of hand lever 61 Fig. 1 will result in cam-like engagement between the lower lip of the flattened portion of the shaft and the inner surface of hook 65', the parts being abutted by lugs 62 against extensions 63', to replace the several parts into the position shown in Fig. 4.

It has already been noted that the locking action of shaft 60 as engaged with hook 65' depends upon the retention of shaft 60 in suitable lateral position within the slots of member 58 and with relation to hooks 65'.

For the purpose of holding shaft 60 in the lateral position described, I have provided locking members as 63 which are shown in the several views, particularly in Figs. 1, 2, 7 and in detail in Fig. 8. The locking members are pivotally mounted within member 58 by means of brackets 64 which are affixed to a supporting portion of member 58, and disposed, as shown, adjacent the ends of shaft 60.

Members 63 are so formed at their free ends as to partially surround shaft 60 and are so disposed as to rest upon the upper side of shaft 60, as best shown in Fig. 2 and at the right in Fig. 8, when the shaft is laterally positioned in locking relation to hooks 65' as shown in Fig. 4.

The view shown in Fig. 1 will disclose that the uppermost inner edges of locking members 63 are chamfered in such a manner as to receive rollers 65 which are suitably mounted in link members 66 as shown. Also mounted in links 66 are rollers 67 which are adapted to roll upon the inner surface of member 58. Due to their disposal relative to the several parts, rollers 65 and 67 are adapted to abut, in a wedging relation, between member 58 and members 63.

Figs. 1 and 7 will disclose that links 66 are pivotally attached to a lever member 68 by means of pins 68'. Lever 68 is pivotally mounted upon a boss portion 69 of member 58. A coil spring 70, anchored to member 58 and to lever 68 as shown, tends to urge lever 68 to assume a position of alignment with links 66, as shown in Fig. 6.

Secured to a cross shaft 71 which is slidably mounted in member 58 is a double finger member 72, the finger portions of which are adapted to engage extended portions of the pins 68'.

The views shown in Figs. 6 and 7 will illustrate that spring 70 tends to rotate lever 68 in a clockwise direction and thereby place pins 68' in contact with the finger portions of member 72. Obviously, with lever 68 and associated parts in position as shown in Fig. 7, rotation of lever 68 as described will result in shifting movement of shaft 71 together with finger member 72 to place the parts in the aligned position shown in Fig. 6, with the pins 68' abutted against opposite sides of the fingers of member 72, and shaft 71 approximately centralized relative to member 58.

Referring again to links 66, it will be noted best in Fig. 1 that an extended end of each link is adapted to be loosely retained within portions of brackets 56 and 57 which arrangement tends to retain links 66 and rollers 65 and 67 in suitable alignment relative to their respective contacting surfaces.

Considering the foregoing, it will be clear that with the several parts positioned as in Figs. 1 and 6, rollers 65 and 67 are positioned to retain lock members 63 in firm contact with shaft 60, whereas manipulation of either of knobs 71' of shaft 71 toward member 58 will result in rotation of lever 68 and consequent displacement of links 66 to withdraw rollers 65 and 67 from retaining position as shown in Fig. 7.

As previously noted, the locking action of shaft 60, in engagement with hooks 65', depends upon the retention of shaft 60 in suitable lateral alignment relative to the hooks. The pressure of springs 59 tends to force member 58 upward and the shaft 60 out of engagement with hooks 65'.

The lateral position of shaft 60 will be out of alignment with the curved portion of locking members 63, as shown at the left in Fig. 8, when operated by the release knob 71', whereas when shaft 60 is in the locking position shown in Fig. 4, under actuation by the lever 61, the shaft is so aligned as to occupy the curved portion of members 63 as shown at the right in Fig. 8.

Bearing in mind that rollers 65 and 67 are constantly urged outwardly by the spring 70 as described, it will be clear that, with shaft 60 positioned as shown in Fig. 5, the shaft and locking members 63 will be disposed as shown at the left in Fig. 8, also lever 68 and links 66 will be disposed as shown in Fig. 7. With the several parts disposed as above, it will be clear that clockwise rotation of shaft 60, as previously described, will place it in the position shown in Fig. 4, which will correspond to the relative position shown at the right in Fig. 8, wherein shaft 60 occupies the concave portion of members 63 in which position rollers 65 and 67 are free to advance, as urged by spring 70, toward position to firmly retain members 63 upon shaft 60 as shown, and lever 68 and links 66 to assume an aligned position, as shown in Fig. 6.

Obviously, with the parts aligned and locked as described, a slight manipulation of shaft 71, as described, will displace lever 68 to withdraw links 66 and rollers 65 and 67 from retaining contact with members 63, thus releasing shaft 60 to permit lateral movement and escape thereof from hooks 65'.

A coil spring 73 anchored to a bracket 84 and retained upon shaft 60 as shown, tends to rotate shaft 60 in a counter-clockwise direction and thus to urge the shaft, at the time of its escapement from hook 65', to assume the position shown in Fig. 5.

A brief description has been given herein covering a clutching mechanism which is more fully described in my Patent No. 1,868,343.

The operation of this mechanism will not be described further than to explain that it is adapted to be operated through the agency of manually operated means for alternately obstructing and releasing a member of the clutch mechanism.

Associated with the present invention and forming a part thereof is a novel means for operating the said clutch which may be described as follows:

Fig. 1 will disclose a vertically disposed member 74 which is slidably mounted in structure 11 and urged downwardly by a spring 74', which is retained upon member 74 in a suitably formed cavity in structure 11, as shown.

The lower end of member 74 is adapted to engage a portion 76 of a member of the clutch operating mechanism, its function being to obstruct the rotation of the portion 76 when in a lowered position as shown in Fig. 1, and when elevated, to permit the escapement of portion 76 and consequent engagement of the clutch mechanism to operate the wringer rolls.

Operation of member 74, to engage portion 76 as described, is accomplished by means of a mechanism which includes a forked lever member 75 pivotally supported by means of a pin 75' in a bracket portion of structure 10.

Member 74 is pivotally attached to lever 75 by means of a pin 77. The legs of the forked portion of lever 75 are disposed as best shown in Fig. 4 and are adapted to receive the lower ends of angulated upright members 78 which are slidably mounted in structure 10, and disposed at either side thereof. Suitable knobs as 79 (Figs. 2, 4 and 5) provide convenient means for manipulation from either side of the wringer.

The foregoing will illustrate that member 74 is manually operable to effect operation of the roller drive clutch mechanism by means of manipulation of knobs 79. Slight manual pressure upon either of knobs 79 will result in immediate response of the clutch mechanism to start or stop rotation of the wringer rolls. The member 79 and associated connections to the clutch constitute what might be styled a latch escapement.

Obviously it is desirable, when contact pressure between the rolls is released, as described, to also disengage the roll driving means. For this purpose, a means is provided for automatically operating the lever 75 to disengage the driving means.

As shown in Fig. 4, a lever member 80 is pivotally mounted upon structure 10 by means of a screw 81 that frictionally holds said member 80 in adjusted positions. Lever 80 has an upright portion 82 which is adapted to contact with the shaft 60 in such a manner that rotation or displacement of the shaft will cause a rocking movement of the lever. A lower portion 83 of lever 80 extends at approximately right angles with portion 82 and is adapted to engage an upright link member 84 which is loosely retained at its upper end, in structure 10, the lower end being bifurcated pivotally attached by embracing relation with the lever 75, as shown in Figs. 4 and 5. A spring 85, disposed as shown, acts to retain link 84 in position to be engaged by portion 83. The mechanism may be also styled a latch escapement.

When the top frame 58 is locked on the lower frame 10 by rotation of the lever 61, the lug 61' engages the pin 80' on the pivoted lever 80 to return lever 80 to the position shown in Fig. 3. The link 84 accommodates itself to the movement of the lever 80 by reason of its pivotal attachment to the lever 75 and the tension of the spring 85.

Considering the foregoing, it will be clear that with the several parts in position as shown in Fig. 4, manipulation of either of knobs 71' will result in lateral and rotative movement of shaft 60 as already described, to escape hook 65', to place shaft 60 in position as shown in Fig. 5, to actuate lever 80 as shown, which movement of lever 80 will result in downward movement of portion 83 to momentarily displace and escape from link 84. Momentary displacement of link 84 will result in actuation of lever 75 to disengage the roll driving mechanism as described.

In the practical use and operation of a wringer of the roll type described herein, it frequently occurs that water extracted from garments being wrung flows downwardly upon the under surface of roller 17 in such a manner as to be discharged on the side of the wringer opposite that from which the garments are being fed to the wringer.

To insure that all extracted water shall be discharged on the feeding side, which may be either side according to the direction of the rotation of the rolls, I have provided an apron member 86 which is disposed below and adjacent to roll 17, as best shown in Figs. 1 and 2. The apron is rockably supported, as in Fig. 1, in structure 10.

at the left hand end by means of a stud 87 and at the right hand end by means of a sleeve and bolt assembly 88. Included in the assembly 88 is a tooth member 89 which is clearly shown in Fig. 3. Sleeve and bolt 88, together with tooth 89 are assembled in such a manner that tooth 89 is affixed to apron 86 and is adapted, when actuated, to rock the apron upon its supporting means as will be described.

To actuate the apron 86 I have provided a slip collar member 90 which is frictionally mounted upon the coupling collar 47 and adapted to rotate with or slip thereon as required. Collar 90 carries two projecting finger portions 91 which are adapted to engage either side of tooth 89, as shown in Fig. 3, in such a manner that rotation of collar 90, in unison with collar 47 in either direction, will result in actuation of tooth 89 to rock and position apron 86 to shed water toward the side of the wringer from which garments are being fed. In practical operation, when the wringer rolls rotate in a given direction collar 90 will rotate in unison therewith and thereby engage one of portions 91 with tooth 89 resulting in actuation of tooth 89 to rock apron 86 as described. When apron 86 is suitably positioned, tooth 89 will act as an obstruction to portion 91 to cause collar 90 to slip upon collar 47. Obviously, reversal of rotation of the wringer rolls will result in opposite movement of collar 90 to rock and position apron 86 in suitable relation to the rolls and their direction of rotation, as described.

A complete embodiment of my invention having now been described, it may here be in order to describe a variation in the clutch operating means. As previously noted herein, the driving clutch operating mechanism has already been fully disclosed in my Patent No. 1,868,343, however, in order to more clearly illustrate the present device, the structure and function of certain of the clutch operation devices will be described.

Before proceeding with the description, it may be in order to explain that the control mechanism to be described is identical with the mechanism previously described herein with the exception that in the case of the formerly described arrangement it is necessary that the control means, such as knobs 79, be manipulated in a prescribed manner, that is, in order to insure the desired operation of the clutching means, it is necessary to press upon the knobs 79 and promptly release them, prompt release being quite necessary in order that the clutch operating means may function as intended.

Under conditions of practical use, it is possible that an operator, having actuated a knob 79 to stop rotation of the wringer rolls, may fail to release the knob quickly enough to allow plunger member 74 to return to normal position in time to intercept the oncoming abutment portion. In this event, cam 28, instead of moving only through 180 degrees to a stop as desired, would continue rotation, which movement would result in momentary stoppage and almost immediate resumption of rotation of the wringer rolls.

Such operation of the device is obviously undesirable and to obviate the possibility of its occurrence I have provided means whereby member 74 is automatically returned to obstructing position regardless of improper manipulation of the knobs 79.

Fig. 10 will disclose that within the lower housing formed in structure 11, there is disposed a ratchet member 29 which is pinned to the driving shaft 24. Upon a downwardly extending hub portion of ratchet 29 is rotatably mounted a cam member 28.

The clutching mechanism associated with, and operated through, the ratchet 29 and cam 28, having already been explained, will not be described here further than to say that the operation of the clutch, into and out of engagement with the wringer driving devices, depends upon rotation of the cam 28 in steps of 180 degrees. For illustration, cam 28, when resting as shown in Fig. 10, is in position to retain the clutch 32 in declutched position relative to clutch member 33, whereas rotation of cam 28 through 180 degrees would present the opposite or higher side of the cam to link 35, thereby allowing spring 31 to propel clutch 32 upwardly and into engagement with clutch member 33.

In order to effect suitable operation of cam 28, as described, to control the wringer driving mechanism, means are provided for rotating the cam as follows:

As shown best in Fig. 11 two levers, 100 and 101, of semi-circular form are pivotally mounted upon the upper surface of cam 28 by means of a screw 102. Lever 100 is disposed below lever 101 and has extended finger portions 103 and 104 at either end as shown. The finger portion 104 has upwardly extending abutment portions 105 and 106 while finger 103 has a similar portion 107. Abutments 105, 106 and 107 extend upward and beyond lever 101 as shown in Fig. 10 and are adapted to loosely engage finger portions 108 and 109 of lever 101. Lever 101 carries an inwardly extending tooth portion 110 adapted to engage with the teeth of ratchet 29. A spring 111 anchored to the body of cam 28 and hooked to an extension of abutment portion 106, tensions lever 101 to urge tooth 110 into engagement with ratchet 29.

The foregoing will illustrate that with ratchet 29 rotating as shown by arrow in Fig. 12, and lever 101 rotated upon screw 102 to engage tooth 110 with ratchet 29, unitary rotation of cam 28 with ratchet 29 will take place. Obviously, this rotation will continue until abutment portion 107 reaches a position to engage with the lower end of plunger member 74 in which position unitary rotation of lever 101 with ratchet 29 will be arrested, resulting in rotation of lever 101 upon screw 102 to withdraw tooth 110 from engagement with ratchet 29 as shown in Fig. 11, in which position ratchet 29 may continue rotation while cam 28 will remain stationary.

Upward movement of member 74 to withdraw it from obstructing position relative to abutments 106 or 107 will result in release of levers 100 and 101 and rotation of same to re-engage tooth 110 with ratchet 29 to re-establish unitary rotation as noted. It will be clear that intermittent rotation of cam 28 in half revolutionary steps will result from successive upward movements of member 74; however, to insure that cam 28 be rotated only as desired, that is, in half revolutionary steps to start and stop the wringer mechanism, it is essential that member 74, after having been elevated to permit escapement of, for example, abutment 106, be immediately returned to its original position, as already noted, so as to be in position to obstruct abutment portion 107 and arrest rotation of cam 28 as described.

Automatic return of member 74 is provided by the following means:

Fig. 10 will disclose that lever 75 may be replaced by a lever of different design such as 112 which is pivotally mounted upon structure 10 by means of a stud 113.

A pawl member 114 is slidably mounted upon lever 112 by means of the stud 113 and a stud 115 which latter is secured in lever 112. A spring 117, anchored to an extending portion of lever 112 and hooked to an extension of pawl 114, reacts to retain pawl 114 in extended relation to lever 112, in which position the lip 116 of pawl 114 is adapted to engage a hook portion 118 of plunger member 74.

The arrangement of pawl 114 with relation to lever 112 and hook 118 is such that when lever 112 is rotated upon stud 113 by manipulation of knobs 79, lip 116 is positioned to engage hook 118 to propel plunger member 74 upwardly a sufficient distance to permit escape of abutment member 106 or 107. The rotational center of pawl 114 is so disposed with relation to the vertical line of movement of hook 118 that the arc of travel of lip 116 leads away from the line of travel of hook 118, therefore when lip 116 reaches a certain point in its stroke, it will be in a position to allow hook 118 to escape and plunger member 74 to resume its normal position to obstruct the oncoming abutment member as described.

Operation may be summarized as follows: With shaft 24 rotating, clutching member 32 disengaged from clutching member 33, and escapement mechanism positioned as shown in Fig. 10, rotation of wringer rolls may be started by a downward manipulation of one of knobs 79, which manipulation will cause rotation of lever 112 together with pawl 114 upon stud 113, as described, resulting in corresponding movement of lip 116 to elevate plunger member 74 to permit escapement of, for example, abutment portion 106. Rotation of lever 112 and pawl 114 will result in elevation of plunger member 74 as noted and subsequent escapement of hook 118 from lip 116 to allow plunger member 74 to return to its original lowered position. The described escapement of abutment portion 106 will result in engagement of tooth 110 with ratchet 29 and unitary rotation of cam 28 to a point where abutment portion 107 is engaged by the lowered plunger member 74, which rotation of cam 28 will result in engagement of clutch member 32 with clutch member 33 to drive the wringer rolls.

Further manipulation of knobs 79 as already described will result in repetition of described movement of plunger member 74 to permit further rotation of cam 28 through one-half revolution, to disengage the driving clutch and thereby stop rotation of the wringer rolls.

It is thought that the foregoing will clearly indicate the difference in utility as between the former and latter described control devices, which difference lies in the fact that in the former case, if knobs 79 are depressed and retained in a lowered position, member 74 will be permanently withdrawn from the path of abutment portions 106 and 107, which will allow continuous rotation of cam 28 and undesired intermittent rotation of the wringer rolls, whereas with the latter arrangement subsequent operation of the clutch mechanism is impossible except through movement of knobs 79 through a complete cycle, that is, the knob having been depressed, to actuate the clutching mechanism, must be released and again depressed in order to again actuate the clutching mechanism.

The normal positions of the parts are shown quite clearly in Figs. 1, 2, 3 and 4 of the drawings and when thus positioned the springs 59 are exerting upward pressure on the top frame portion 58 and holding the ends of the rod 60 in engagement with the hook portions 65', it being understood that the rod 60 is being held against lateral movement in the slots in which they operate by means of the members 63, this position being shown at the right hand side of Fig. 8 of the drawings, this engagement between the ends of the rod 60 and hook portions 65' being sufficient to prevent the spring 73 from rotating the rod 60. In case of accident, and it is desired to release the top portion of the frame, the rod 71 will be moved crosswise of the top frame portion 58 by engaging one of the members 71'. The rod 71 is shown in its normal position in Fig. 6 of the drawings and is shown in its laterally moved position in Fig. 7. When the rod 71 is moved laterally, or crosswise of the top portion of the frame, it moves the links 66 into the position shown in Fig. 7 of the drawings and the rollers 65 and 67 are thereby withdrawn from their wedging position shown in Fig. 1 to release the members 63 and permit them to rise into the position shown at the left of Fig. 8, as the rod 60 is moved laterally in the slots formed in the ends of the top portion 58. It will be understood that as soon as the members 63 are released the upward pressure of the springs 59 causes the top portion 58 to move upwardly and as the recesses in the hook members 65' are curved, as shown more particularly in Figs. 4 and 5 of the drawings, the upward pressure movement on the top portion 58 will cause the rod 60 to move laterally in the slots in the ends of the top portion. When the rod 60 starts to move laterally the engagement between the ends of the rod 60 and the hook portions 65' is overcome sufficiently to permit the spring 73 to rotate the rod 60 into the position shown more particularly in Fig. 5 of the drawings. As soon as pressure or pull is released from the rod 71 the rod is returned to its normal position shown in Fig. 6 of the drawings by the spring 70 and this movement in turn straightens out the links 66 and carries the rollers 65 and 67 into the wedging engagement with the members 63. With the members 63 raised, as shown at the left of Fig. 8, when the rollers 65 engage the members they force the same downwardly and as the ends of the edge portions of the members engage the rod 60 they draw the same back into the normal position in the slots shown at the right of Fig. 8. It will thus be seen that, as previously stated, the members 63 are used to normally hold the rod against lateral movement and they do not hold the rod against rotary movement.

In instances, such as when the wringer is not to be used for some time, it is desired to relieve pressure between the rollers 16 and 17 and this can be done by manipulating the hand lever 61 to rotate the rod or shaft 60 in a counter-clockwise direction and into the position shown in Fig. 5 of the drawings. When in this position the upper frame portion 58 will be raised by the springs 59.

When the rod or shaft 60 is rotated from the position shown in Fig. 4 or moved laterally in the slots through which the ends project it will engage the arm 82 of the lever 80 and lower the arm 83 which normally rests on the upper end of the link 84, as shown more particularly in Fig. 4 of the drawings, the member or lever 80 swinging on the pivot 81. As the arm 83 is lowered it will in turn lower the link 84 and through the lever 75 raise the plunger 74 to disengage the same from the abutment 76 and allow the cam 28 to rotate a one-half revolution. This will draw the clutch member 32 downwardly out of engagement with the clutch member 33 and the operation of the machine will be stopped. When the hand lever 61 is operated to rotate the shaft or rod 60 it also releases the pressure between the rollers 16 and 17, releases the rod or shaft 60 from the latching members 65' and controls the clutch. When it is desired to reset the machine into operative position the hand lever 61 will be manipulated to rotate the rod or shaft 60 in a clockwise direction to engage the ends with the latching members 65' and this will draw the upper frame member downwardly and apply pressure between the rollers 16 and 17. In this manipulation of the hand lever the projection therefrom will engage the pin projecting from the side of the member or lever 80 and swing the lever 80 on the pivot 81 to its normal position shown in Fig. 4 of the drawings and the spring 85 will pull the upper end of the link 84 into its engaging position beneath the arm 83. Ordinarily the driving clutch will be set to its operating position by manipulating one of the keys 79, but if desired, the clutch may be reset by rotating the shaft 60 slightly in a counter-clockwise direction which will again manipulate the lever 80 to lower the link 84 and raise the plunger 74 to permit a half revolution of the cam 28 to raise the clutch member 32 into engagement with the clutch member 33. In other words when the shaft or rod 60 is rotated by the handle 61 in a clockwise direction from the position shown in Fig. 5, it will apply pressure to the rolls and engage the latch members 65' and then by a slight reversing movement of the rod or shaft the lever 80 will be engaged to operate the clutch, thereby there is a single manually operable means for controlling the application of pressure between the rollers and controlling the operation of all of the latching means and clutch. At the same time in releasing the upper frame member 58, from the lower frame member, by manipulation of the level 61 a rotation of the shaft or rod 60 in a counter-clockwise direction releases the latch members, releases the pressure between the rollers and controls the clutch.

While, as stated, ordinarily the clutch is reset into operative position by manipulation of the keys 79 one may, when desired, place the clutch in operative or inoperative position by simply manipulating the lever 61.

What I claim is:

1. A wringing device including in combination a lower frame, upper and lower wringer rolls disposed therein, a releasable upper frame, spring tensioning means carried by the upper frame, means for connecting the upper frame to the lower frame in a tensioned manner comprising a rod passing horizontally through the upper frame, cam fashioned latch mechanism at the opposed ends of said horizontal rod operatively connected with the lower frame, a manual control handle connected to one end of the horizontal rod adapted to connect the upper frame to the lower frame in a tensioned manner, and safety release mechanism comprising latch mechanism carried in the upper frame and normally holding the horizontal rod in a fixed position, means including a wedge member in the upper frame normally maintaining said latter latch mechanism in a fixed position and a readily accessible manually operated member carried by the upper frame controlling the movement of said wedge member and thereby controlling the quick release of the upper frame with respect to the lower frame.

2. A wringing device including in combination a lower frame, upper and lower wringer rolls carried therein, a releasable upper frame, bearing retention members supporting the ends of the upper wringer roll, spring members carried by the upper frame operatively connected with said bearing retention members at their lower ends, manually controlled cam operated means for connecting the upper frame to the lower frame and simultaneously applying pressure between the rolls, and safety release mechanism including latch members carried in the upper frame for said cam operated connecting means, and a readily accessible manually operated means controlling the movement of said latch members.

3. A wringing device including in combination a lower frame, upper and lower wringer rolls therein, an upper frame, spring pressure means operatively associating the upper frame with the wringer rolls, means for connecting the upper frame to the lower frame in a latched and tensioned manner including a horizontally disposed rod carried by the upper frame, and manually controlled cam operated connections upon the opposite ends of said horizontal rod, and safety release mechanism including members carried by the upper frame and normally holding the horizontal rod in a fixed position, wedge members in the upper frame normally holding said latch members against said horizontal rod and a readily accessible manually operated quick release means for said wedge members and latch members whereby movement of the horizontal rod is permitted for subsequent detachment of the upper frame and release of pressure.

4. A wringing device including in combination a lower frame having upper and lower wringer rolls disposed therein, an upper frame, nested spring pressure members carried by the upper frame, means for connecting the upper frame to the lower frame comprising a loosely held horizontally disposed rod carried in the upper frame, means for locking the upper frame to the lower frame including a cam fashioning of the projecting ends of the horizontal rod, operatively associated locking mechanism on the lower frame co-operating with the cam surfaces of the horizontal rod, manual means for rotating said horizontal rod, all of said locking mechanism being disposed exteriorly of the upper and lower wringer frame, and quick release mechanism including latch mechanism normally holding the horizontal rod against lateral movement and a readily accessible manual member controlling the operation of said latch mechanism.

5. A wringing device including in combination a lower frame, upper and lower wringer rolls contained therein, spring pressure means, an upper frame, means for connecting the upper frame to the lower frame including a horizontally disposed rod carried by the upper frame, said means for connecting the upper frame to the lower frame also including a cam fashioning of the outer ends of the horizontal rod, co-operative locking portions carried upon the lower frame, and a manually operated member for rotating the horizontal rod to accomplish the tensioned connection between the upper frame and the lower frame, driving means for the lower roll, a clutch in said driving means, and connecting means between the upper frame and clutch including a member having a frictional connection with portions of the lower frame and a member operatively connected thereto to release the clutch following release of the upper frame.

6. A wringer mechanism including in combination a lower frame, an upper frame, upper and lower wringer rolls, means for applying pressure between the rolls, including manually operated means for connecting the upper frame to the lower frame, driving means for the wringer rolls, a clutch in said driving means, power driven mechanism for actuating the clutch, mechanism controlling the operation of said clutch actuating mechanism upon release of the upper frame from the lower frame, said second mechanism including a latch escapement adjacent the upper frame and a second latch escapement controlling the movement of the power driven clutch actuating mechanism.

7. A wringer mechanism including in combination a lower frame, having upper and lower wringer rolls disposed therein, an upper frame releasably lockable upon the lower frame, means for applying pressure between the upper and lower wringer rolls, comprising manually operated cam actuated means for locking the upper frame to the lower frame in a tensioned manner, including a horizontally disposed rod carried by the upper frame, safety release mechanism operating to release the upper frame, to relieve pressure between the rolls including latch members carried by the upper frame and normally holding the horizontal rod in a fixed position which it assumes when the upper frame is in a locked position with the lower frame, laterally moving wedge members and cooperating means in the upper frame controlling the movement of said before mentioned latch members, retention members in the upper frame carrying the outer and movable ends of the wedge members and a manually operated push or pull rod projecting through the upper frame of the wringer operatively connected to said wedge members and means cooperating with the latter in a manner to control the movement of said latches and consequently the movement of said horizontal rod.

8. In a wringer, a main frame, a roller journalled therein, a second frame adapted to cooperate with the main frame, supporting members carried by said second frame, journals carried by said supporting members and movable relative thereto, a second roller mounted in said journals and resilient means urging said journals away from said second frame, means for releasably locking the second frame in position on the main frame and safety release mechanism including a push or pull rod mounted upon the second frame and passing through opposite portions thereof.

9. In a wringer, a main frame, a roller journalled therein, a second frame adapted to cooperate with the main frame, supporting members carried by said second frame, journals carried by said supporting members and movable relative thereto, a second roller mounted in said journals and resilient means urging said journals away from said second frame, means for releasably locking the second frame in position on the main frame and safety release mechanism including a push or pull rod disposed transversely of the second frame.

10. In a wringer, a main frame, roller members carried thereby, a second frame adapted to cooperate with the main frame, means for releasably locking the second frame in position on the main frame, and safety release mechanism including a readily accessible push or pull rod longitudinally slidable and passing through opposite portions of the second frame.

11. In a wringer, a main frame, roller members carried thereby, a second frame adapted to co-operate with the main frame, means for releasably locking the second frame in position on the main frame and safety release mechanism including a readily accessible longitudinally movable push or pull rod carried transversely of the second frame.

12. In a wringer, the combination of a frame, rolls mounted in the frame, pressure mechanism for the rolls, a safety release device cooperatively associated with the pressure mechanism for releasing pressure on the rolls, including a manually operable member, and means responsive to movement thereof actuating the release device, a power source, a driving connection between the power source and said rolls including clutch means, power means for operating the clutch means, and means for controlling the operation of said power means including means rotatable about a substantially horizontal axis and responsive to movement of said release device and a plurality of vertically movable elements arranged in non-alignment and operable independently of said release device.

13. In a wringer, the combination of a frame, rolls mounted in the frame, pressure mechanism for the rolls mounted in the frame, a safety release device releasing pressure on the rolls, a power source, a driving connection between the power source and said rolls, a clutch in said driving connection operative to start or stop the rolls, power means for operating the clutch, a manually operable member and means responsive to movement thereof to actuate said release device, and means to actuate said power means to operate said clutch to stop the rolls including means actuated by the manually operable member acting substantially simultaneously with the actuation of the release device and other means operable independently of said release device.

14. In a wringer of the type having an emergency release for the rollers thereof, a frame, cooperating rollers associated with the frame, a combined head and housing freely movable with respect to the frame and having spaced depending sides, the release including a latching mechanism associated with the said combined head and housing and having means for releasably locking the said combined head and housing in operative position, and pressure mechanism for the rollers, said latching mechanism being housed within the head and embodying release actuating elements traversing the said depending sides of said combined head and housing and guided thereby, operable toward or away from the said combined head and housing, and means common to the pressure mechanism and the latching mechanism for resetting these parts.

15. In a wringer of the type having an emergency release for the rollers thereof, a frame, cooperating rollers associated with the frame, a combined head and housing freely movable with respect to the frame and having spaced depending sides, the release including a latching mechanism associated with the said combined head and housing and having means for releasably locking said combined head and housing in operative position, and pressure mechanism for the rollers, said latching mechanism being housed within the head and embodying release actuating elements traversing the said depending sides of said combined head and housing and guided thereby, operable either toward or away from the said combined head and housing.

16. In a wringer of the type having an emergency release for the rollers thereof, a frame, cooperating rollers associated with the frame, a combined head and housing freely movable with respect to the frame, a latching mechanism associated with the combined head and housing and having means for releasably locking the combined head and housing in operative position, and pressure mechanism for the rollers, and a releasing device for the latching mechanism embodying actuating elements traversing portions of said combined head and housing and guided thereby for movement in a direction substantially laterally of the head and housing, either toward or away from said combined head and housing.

17. In a wringer of the type having an emergency release for the rollers thereof, a frame, cooperating rollers associated with the frame, a combined head and housing freely movable with respect to the frame and having spaced side walls extending continuously in one piece approximately throughout the length of the rollers, a latching mechanism associated with the said combined head and housing and having means releasably locking the combined head and housing in operative position, a pressure mechanism for the rollers, and a releasing device for said latching mechanism embodying actuating handles positioned at the respective side walls of the combined head and housing and having portions traversing said side walls in lines approximately at right angles to a line parallel to the longitudinal axes of said rollers.

18. In a wringer of the type having an emergency release for the rollers thereof, a frame, cooperating rollers associated with the frame, a combined head and housing freely movable with respect to the frame, a latching mechanism associated with the said combined head and housing and having means releasably locking the bodily movable head member in operative position, a pressure mechanism for the rollers, a releasing device for said latching mechanism embodying actuating handles and latch releasing motion transmitting means responsive to movement of said actuating handles either toward or away from said combined head and housing, said combined head and housing being provided with spaced openings extending substantially at right angles to the axis of the said combined head and housing and slidably receiving and guiding portions of said actuating handles for movement in lines approximately at right angles to a line parallel to the longitudinal axes of said rollers.

19. In a wringer, a drive member having a clutch, a power take-off unit in operative relation to the clutch and having means whereby the same is energized by said drive member, wringer rolls, pressure means for said wringer rolls, a frame having a combined head and housing freely movable with respect thereto, a latching mechanism associated with the said combined head and housing and having means for releasably locking the said combined head and housing in operative position, an emergency release mechanism for releasing pressure on said rolls and simultaneously releasing said combined head and housing, said releasing mechanism having latch-releasing motion-transmitting means, and means actuated by the movement of said motion transmitting means for placing said power take-off unit in position to be energized by said drive member so that the release of pressure on the rolls is followed by clutch actuation through operation of the power take-off unit.

20. In a wringer of the type having a frame and emergency release for the rolls thereof, driving means therefor and a clutch in said driving means, mechanism operating the clutch, rolls associated with the frame, a pressure mechanism for the rolls, manually operative safety release mechanism movable relative to the wringer for relieving frame pressure between the rolls, and a separately mounted manually operated member for resetting the pressure and automatically resetting the clutch operating mechanism to operate the clutch following actuation of the safety release mechanism.

21. In a wringer of the type having a frame and emergency release for the rolls thereof, driving means therefor, and a clutch in said driving means, mechanism operating the clutch, rolls associated with the frame, a pressure mechanism for the rolls, manually operated safety release mechanism movable relative to the wringer frame for relieving pressure between the rolls and a separately mounted manually operated horizontally disposed rod member for resetting the pressure and automatically resetting the clutch operating mechanism to operate the clutch in the driving mechanism following actuation of the release mechanism.

22. In a wringer of the type having a frame and emergency release for the rolls thereof, driving means therefor and a clutch in said driving means, mechanism operating the clutch, cooperating rolls associated with the frame, a pressure mechanism for the rolls including a head member freely movable with respect to the frame and means for latching the head member in operative position with the frame, a manually operated release device movable relative to the wringer frame for said latching means, a separately mounted horizontally disposed member operatively connected to the latching and pressure means for resetting the pressure upon the rolls following actuation of the release device and mechanism connecting said horizontal member with the clutch operating mechanism for controlling the starting and stopping of the wringer rolls.

23. In a wringer of the type having a frame and emergency release for the rolls thereof, driving means therefor and a clutch in said driving means, mechanism operating the clutch, cooperating rolls associated with the frame, a pressure mechanism for the rolls including a head member freely movable with respect to the frame and means for latching the head member in operative position with the frame, a manually operated release device movable relative to the wringer frame for said latching means, and a separately mounted manually operated rotatable rod member for resetting the pressure upon the rolls following actuation of the release device and mechanism operated by the movement of said rod member for resetting the clutch operating mechanism to control the clutch in the driving mechanism.

24. In a wringer of the type having a frame and emergency release for the rolls thereof, driving means therefor and a clutch in said driving means, mechanism operating the clutch, cooperating rolls associated with the frame, a pressure mechanism for the rolls including a head member freely movable with respect to the frame and means for latching the head member in operative position with the frame, a manually operated release device movable relative to the wringer frame for said latching means, a separately mounted movable rod member operatively connected with the latching and pressure means for resetting the pressure upon the rolls following actuation of the release device and mechanism operatively connected with said movable rod for controlling the movement of the clutch operating mechanism to place the same in position to operate the clutch during a subsequent release movement.

25. In a wringer of the type having a frame and emergency release for the rolls thereof, driving means therefor and a clutch in said driving means, mechanism operating the clutch, cooperating rolls associated with the frame, a pressure mechanism for the rolls including a head member freely movable with respect to the frame and means for latching the head member in operative position with the frame, a manually operated release device movable relative to the wringer frame for said latching means, and a separately mounted manually operated rotatable rod member for resetting pressure following actuation of the release device and automatically resetting the clutch operating mechanism for operating the clutch to control the wringer drive.

26. A wringer of the type having a frame and an emergency release for the rolls thereof, including driving means for the rolls, a clutch in said driving means, mechanism operating the clutch, a frame, rolls associated with the frame, a pressure mechanism for the rolls, a rod disposed longitudinally of and rotatable in the frame, means cooperating between the pressure mechanism and said rod whereby rotation of the rod in one direction causes actuation of the pressure mechanism to press the rolls together, latch mechanism operative to hold the rod in pressure position, means movable relative to the wringer frame releasing the latch mechanism to permit reverse rotation of the rod and a connection between the rod and said clutch operating mechanism whereby reverse rotation of the rod causes actuation of the clutch to stop the rolls.

27. In a wringer having cooperating squeeze rolls, a driving member, a driven member connected to the rolls to rotate the same and a clutch between the driving and driven members, a power take off unit in operative relation to the clutch whereby it may effect disengagement thereof, said power take-off unit having means whereby it may be energized from said driving member, pressure means for said wringer rolls, an emergency release mechanism for releasing pressure on said rolls, and means actuated by the operation of said emergency release mechanism for effecting energization of said power take-off unit by said drive member so that the release of pressure on the rolls is followed by clutch actuation in response to operation of the power take-off unit.

28. A wringer comprising a main frame, a wringer roll therein, and a top unit comprising a housing, a roll supported from the housing, pressure means carried by the housing cooperatively related with the rolls, and pressure-creating means operatively associated with said housing, including a quick-release mechanism including means within a plane centrally intermediate the ends of the wringer frame having straight-line movement for allowing the housing and its immediately associated roll to rise under the influence of said pressure means to relieve pressure between said rolls, independently of manual actuation of said pressure creating means, and said pressure creating means comprising a manually operable lever formed and arranged to restore the rolls to wringing relationship under pressure.

29. A wringer comprising a main frame, a wringer roll therein, and a top unit comprising a housing, a roll supported from the housing, pressure means carried by the housing cooperatively related with the rolls, a quick-release mechanism including means within a plane centrally intermediate the ends of the wringer frame having straight-line movement for allowing the housing and its immediately associated roll to rise under the influence of said pressure means to relieve pressure between said rolls, in combination with pressure creating means operatively associated with said housing comprising a manually operable lever formed and arranged to restore the rolls to wringing relationship under pressure, said quick release mechanism being movable independently of the manual actuation of the normal-pressure creating means.

30. A wringer provided with a housing comprising superposed frame members, cooperatively related rolls enclosed in the housing, pressure means for the rolls including a quick-release mechanism having elements operating entirely in a plane centrally intermediate of the ends of the frame and movable relative to the wringer frame for allowing one frame member and one of the rolls to rise under the influence of said pressure means, independently of manual actuation of a normal pressure creating means, in combination with said normal pressure creating means including parts housed by one of the frame members and an exposed manually operable lever formed and arranged to restore the rolls to wringing relationship under pressure.

31. A wringer comprising a main frame, a wringer roll therein, and a top unit comprising in part a housing, a roll associated with the housing, pressure means carried by the housing cooperatively related with the rolls, including a quick-release mechanism for allowing the housing and its immediately associated roll to rise under the influence of said pressure means, in combination with pressure creating means comprising a manually operable lever formed and arranged to restore the rolls to wringing relationship under pressure, said quick-release mechanism comprising a rod projecting outside of the housing of the top unit into cooperative relationship with said lever and engaging a complemental part of the main frame.

32. In a wringer, the combination of a frame, rolls mounted in the frame, a movable hollow top bar, pressure means for the rolls exerting pressure from the bar, a safety device comprising a member mounted in the top bar and projecting forwardly thereof and means actuated by the member for releasing the pressure means, and lever mechanism mounted in operative association with the pressure means at the end of the wringer for re-establishing the pressure means again to exert pressure on the rolls from the top bar, the actuation of said safety device being independent of the actuation of said lever mechanism.

33. In a wringer, the combination of a frame, rolls mounted in the frame, a top bar, pressure means for the rolls exerting pressure from the top bar, a safety release device carried by the top bar including a manually operable release for the pressure means engageable at the front of the wringer, and means at the end of the wringer comprising a lever mounted in operative association with the pressure means for resetting the pressure means to exert pressure on the rolls from the top bar.

34. In a wringer, the combination of a frame, rolls mounted in the frame, a movable top bar, pressure means for the rolls exerting pressure from the top bar, a safety release device comprising a member carried by the top bar and means actuated by said member for releasing the pressure means, and means at the ends of the movable top bar including lever means at one end thereof for re-establishing said pressure means to exert pressure on the rolls from the top bar, said lever means co-operating with said safety device to reset the same upon re-establishment of said pressure means.

35. In a wringer the combination of a frame, rolls mounted in the frame, a movable top bar, pressure means for the rolls exerting pressure from the top bar including a member movable relative to the top bar to a pressure creating position and a pressure release position, manual means including a lever at one end of the wringer to move the member to the first position, and a quick-release means including a manually contacted element for actuation and having only straight-line movement operable independently of manual contact with said lever to release the member from the pressure creating position.

36. A wringer comprising a main frame, a movable continuous hollow top section, and cooperatively related rolls within the frame, combined with pressure means for the rolls including a manually-operable lever mechanism operatively associated with the main frame and top section for drawing the top section downwardly toward the main frame and coincidently creating pressure between the rolls, in combination with a quick-release mechanism in the hollow top frame having a manually engageable part projecting through the face thereof operable independently of the manual engagement of said lever.

37. In a wringer, a frame comprising a main body portion and a flanged top section continuous over the entire body portion whereby they form an enclosing casing, wringer rolls mounted within said casing, means for creating pressure between the rolls, and quick-release mechanism within said casing for freeing the top section and for releasing the pressure between the rolls, said pressure-creating means including manually-operable lever mechanism for restoring the pressure between the rolls and for normally holding the top section on the main body portion, and said quick-release mechanism having manually-operable means to initiate its action independently of said lever mechanism.

38. A wringer comprising a main frame and a continuous hollow top section together normally constituting a housing, said top section being mounted whereby it may be moved intact away from the main frame when released, associated rolls within the housing, instrumentalities for operatively coupling the main frame and top section together to draw the top section towards the main frame and correspondingly build up pressure between the rolls including actuating means to effect said operation, and quick-release mechanism having a part thereof within the top section for permitting said movement of the top section and relieving the pressure of the rolls, said quick-release mechanism having a manual push or pull element projecting through the side of the hollow top section for initiating the action thereof independently of said first-mentioned actuating means.

39. A wringer comprising a main frame and a top section together normally constituting a housing, said top section being mounted whereby it may be moved away from the main frame when released, associated rolls within the housing, instrumentalities for operatively coupling the main frame and top section together to enable the holding of the top section towards the main frame and creating pressure between the rolls, actuating means to effect said operation, and said instrumentalities including quick-release mechanism for permitting said movement of the top section and relieving the pressure of the rolls, said quick-release mechanism having a manual control element for initiating the action thereof independently of said first-mentioned actuating means and including mechanism between the quick-release manual control element and the said actuating means whereby, the said mechanism is automatically reset to position enabling the actuating means to effect the holding of the top section and create pressure between the rolls.

40. A wringer comprising a main frame and a top section together normally constituting a housing, said top section being mounted whereby it may be moved away from the main frame when released, associated rolls within the housing, instrumentalities for operatively coupling the main frame and top section together to enable the holding of the top section towards the main frame and creating pressure between the rolls, actuating means to effect said operation, and said instrumentalities including quick-release mechanism for permitting said movement of the top section and relieving the pressure of the rolls, said quick-release mechanism having a manual control element for initiating the action thereof independently of said first-mentioned actuating means, the quick-release mechanism being formed and arranged to restore itself, to cooperating relationship with the actuating means to again enable holding of the top section and creating pressure between the rolls.

41. In a wringer, a frame comprising a main body portion and a continuous hollow movable member together forming an enclosing casing, the movable member constituting top and side portions of said casing, wringer rolls mounted within said casing, means for forcing the top section towards the main body portion and coincidently creating pressure between the rolls, and quick-release mechanism housed in the top of the casing for freeing the top section to permit the same to move away from the upper end of the main body portion and for releasing the pressure between the rolls, said quick-release mechanism and said pressure-creating means each including a relatively independent manually-engageable part to initiate its operation.

42. In a wringer, a frame structure comprising relatively displaceable upper and lower frame portions, a pair of wringer rolls supported in said frame structure, and spring means co-acting between one of the rolls and the upper frame portion, manually operable pressure applying means for drawing the frame portions together with the spring means applying pressure between the rolls, said pressure applying means having a part secured to the upper frame portion and another part secured to the lower frame portion whereby the upper and lower frame portions are interconnected to effect said drawing together of said frame portions, said frame portions being separable only by relative vertical displacement of the frame portions, means for engaging the pressure applying means to hold the same against pressure release movement, said means being constructed for automatic effective engagement with the pressure applying means at the end of the pressure-applying movement thereof, and manually operated means to effect disengagement of the holding means from the pressure applying means to in turn release the upper frame portion for movement relative to the lower frame portion and thereby the pressure between the wringer rolls.

43. In a wringer of the type having an emergency release for the rollers thereof, a frame, cooperating rollers associated with the frame, a combined head and housing freely movable with respect to the frame and having spaced depending sides, a latching mechanism associated with the said combined head and housing and having means for releasably locking the said combined head and housing in operative position, a pressure mechanism for the rollers, and a releasing device for said latching mechanism housed within the head and embodying actuating elements traversing the said depending sides of said combined head and housing and guided thereby, said releasing device also having latch releasing motion transmitting means within said combined head and housing and responsive to said traversing movement of said actuating elements.

44. In a wringer of the type having an emergency release for the rollers thereof, a frame, cooperating rollers associated with the frame, a combined head and housing freely movable with respect to the frame, a latching mechanism associated with the combined head and housing and having means for releasably locking the combined head and housing in operative position, a pressure mechanism for the rollers, and a releasing device for the latching mechanism embodying actuating elements traversing portions of said combined head and housing and guided thereby for movement in a direction substantially laterally of the head and housing, said releasing device also having latch releasing motion transmitting means within said combined head and housing and responsive to said movement substantially laterally of the head of said actuating elements.

45. In a wringer of the type having an emergency release for the rollers thereof, a frame, cooperating rollers associated with the frame, a combined head and housing freely movable with respect to the frame, a latching mechanism associated with the said combined head and housing and having means releasably locking the bodily movable head member in operative position, a pressure mechanism for the rollers, a releasing device for said latching mechanism embodying actuating handles and latch releasing motion transmitting means responsive to movement of said actuating handles transversely of combined head and housing, said combined head and housing being provided with spaced openings extending substantially at right angles to the axis of the said combined head and housing and slidably receiving and guiding portions of said actuating handles for movement in lines approximately at right angles to a line parallel to the longitudinal axes of said rollers.

ALPHEUS W. ALTORFER.